Jan. 6, 1942.  G. H. LE BOEUF  2,268,881
AUTOMOBILE LUGGAGE CARRIER
Filed Oct. 21, 1938  2 Sheets-Sheet 1

Inventor:
George H. Le Boeuf.
By: Brayton W Richards
Attorney.

Jan. 6, 1942.  G. H. LE BOEUF  2,268,881
AUTOMOBILE LUGGAGE CARRIER
Filed Oct. 21, 1938  2 Sheets—Sheet 2
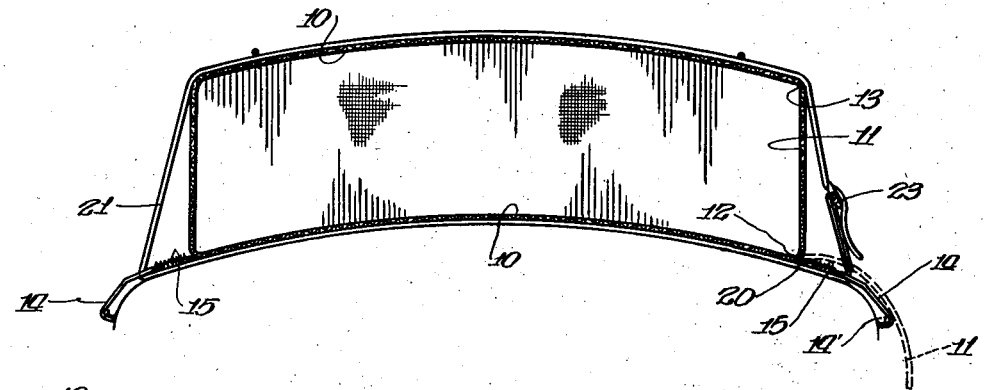
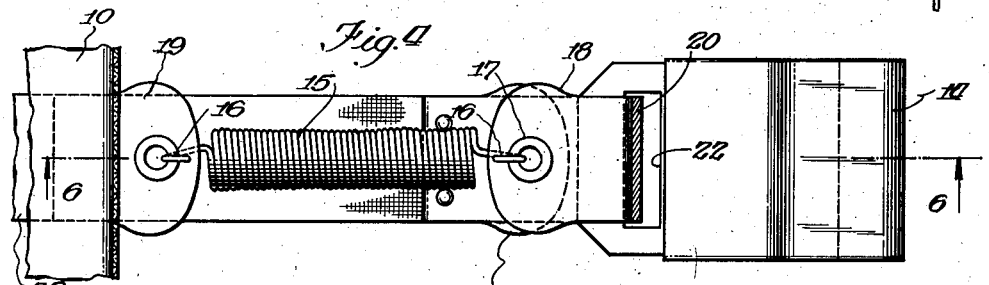
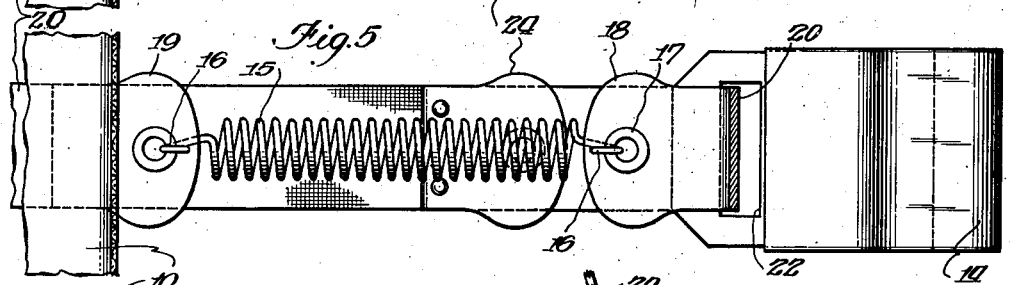
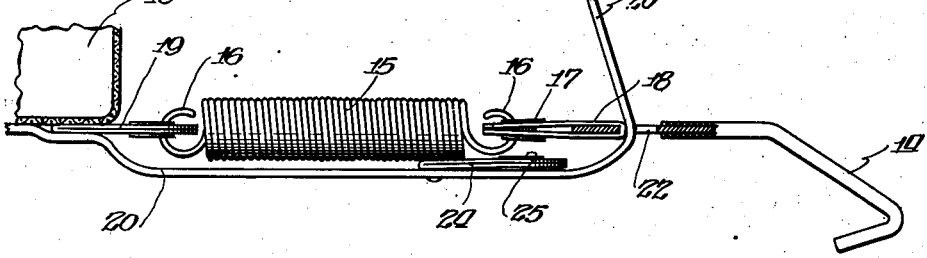
Inventor:
George H. Le Boeuf.
By: Brayton W Richards
Attorney.

Patented Jan. 6, 1942

2,268,881

UNITED STATES PATENT OFFICE 2,268,881

AUTOMOBILE LUGGAGE CARRIER

George H. Le Boeuf, Chicago Heights, Ill.

Application October 21, 1938, Serial No. 236,134

4 Claims. (Cl. 224—29)

The invention relates to improvements in automobile luggage carriers and has for its primary object the provision of an improved arrangement of the character indicated which may be readily applied to the top of an automobile body and which is capable of economical production and highly efficient in use.

Another object of the invention is the provision of an arrangement of the character indicated which may be readily and quickly applied to the tops of automobiles of different widths.

Another object of the invention is the provision of an arrangement of the character indicated so constructed and arranged as to be readily applied to automobile bodies of different widths and further and positively secured in place thereon.

Other objects will appear hereinafter.

The invention consists in the combinations and arrangements of parts hereinafter described and claimed.

Figure 1:
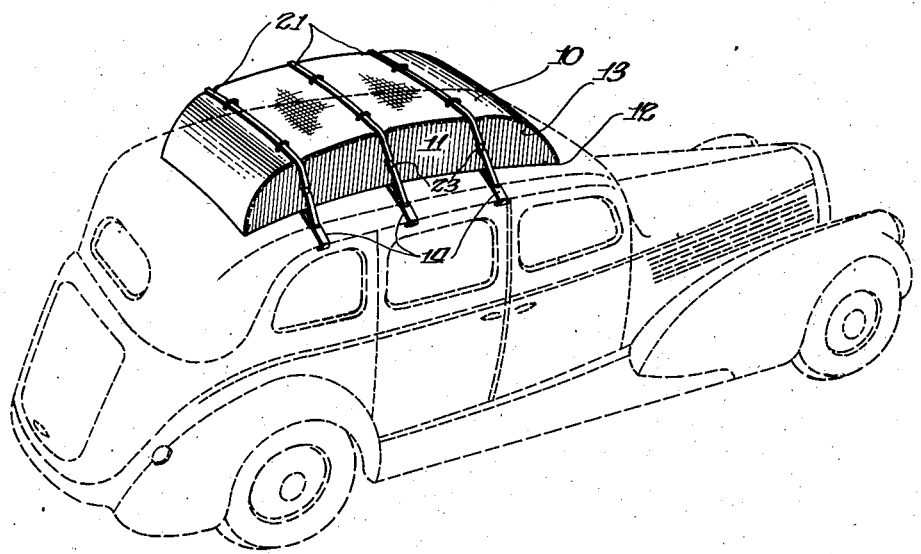
Figure 2:
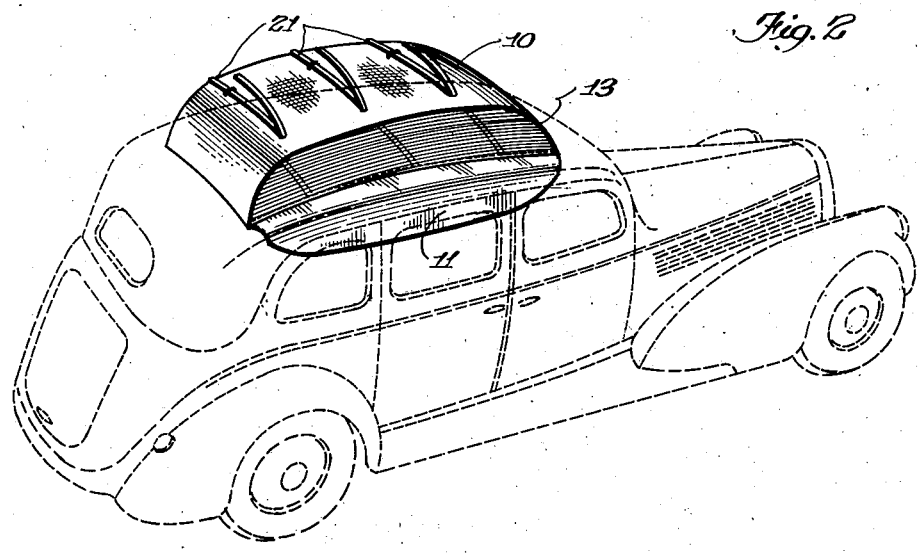

The invention will be best understood by reference to the accompanying drawings forming a part of this specification and in which Fig. 1 is a perspective view of a luggage carrier shown in position of use on top of an automobile body;

Fig. 2 a similar view showing the luggage carrier open for insertion of the luggage therein;

Fig. 3 an enlarged transverse vertical section of the carrier;

Fig. 4 an enlarged detail view of one of a plurality of hooks employed in the construction;

Fig. 5 a view similar to Fig. 4 but showing the hook extended as in actual use; and Fig. 6 a longitudinal vertical section taken substantially on line 6—6 of Fig. 4.

The embodiment of the invention illustrated in the drawings comprises an enclosure 10 made of flexible waterproof material having one side 11 permanently joined to the bottom of the enclosure along the lower side edge 12 thereof, the side 11 being detachably connected with the ends and top of the enclosure by means of a slide fastening 13. By this arrangement when it is desired to place luggage in the enclosure 10 or remove it therefrom, the side 11 will be freed therefrom along its top and end edges and then folded downwardly and outwardly over the edge of the automobile top as indicated in Fig. 2 so as to protect the edge of the automobile top from marring or damage from contact with the luggage being inserted or removed.

A plurality of hooks 14 is arranged along each side of the enclosure 10 as shown. Each of these hooks is secured to the bottom of the enclosure by means of a coiled spring 15 having open eyes or hooks 16 at its ends, one of said eyes 16 being detachably connected through eyelets or grommets 17 in the ends of a folded strap 18 attached as shown to the corresponding hook 14, the other eye 16 being similarly connected with grommets in the ends of a folded strap 19 secured as shown to the bottom of the enclosure 10. Arranged immediately under each of the springs 15 are strap sections 20 and 21 secured as shown to the bottom of the enclosure 10 and passing and sliding through corresponding openings 22 in the hooks 14. The strap sections 20 are provided with buckles 23 for engagement with the ends of the strap sections 21 as best indicated in Fig. 3.

As best shown in Fig. 6 additional securing flaps 24 provided with grommets 25 are secured to the strap sections 20 and 21 for engagement with the eyes 16 of the springs 15, thereby providing for adjustably connecting the springs 15 to the bottom of the enclosure 10 and thus providing for ready attachment to much wider automobile bodies.

By this arrangement the enclosure 10 may be placed upon the top of the automobile and the hooks 14 readily engaged with the ledges 14' on the sides of the automobile body, thereby temporarily holding the enclosure in place and affording a quick and ready means for effecting the attachment in the first instance. After the luggage has been placed in the enclosure 10, the side 11 is closed by means of a slide fastening 13 and the straps 20—21 drawn tightly around the enclosure, thus largely relieving the springs 15 of strain and tension and at the same time positively and firmly securing the enclosure with its load in place.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. An automobile luggage carrier comprising an enclosure adapted to rest on an automobile top; a plurality of coiled springs secured at each side of said enclosure to the bottom thereof; hooks attached to said springs and arranged to engage under ledges at the sides of the body of the automobile; and straps secured to the bottom of said enclosure immediately under each of said springs, there being openings in said hook members for the free passage of said straps, and said straps being adapted and arranged to slide freely through said openings and pass over said enclosure to engage and hold the same in place and relieve the yielding attachment of said hooks from strain.

2. An automobile luggage carrier comprising an enclosure adapted to rest on an automobile top; a plurality of coiled springs secured at each side of said enclosure to the bottom thereof; hooks attached to said springs and arranged to engage under ledges at the sides of the body of the automobile; straps secured to the bottom of said enclosure immediately under each of said springs, there being openings in said hook members for the free passage of said straps, and said straps being adapted and arranged to slide freely through said openings and pass over said enclosure to engage and hold the same in place and relieve the yielding attachment of said hooks from strain; and means for anchoring said springs at different locations on said straps.

3. An automobile luggage carrier, comprising an enclosure adapted to rest upon an automobile top, a plurality of hook elements arranged to engage under ledges at the sides of the body of the automobile, tensioned resilient means connecting said hooks to said enclosure, additional connecting means carried by said enclosure, means on said hook members between the hooks thereof and said tensioned means engaging said last named connecting means, said last named connecting means being adjustable and adapted to be adjusted to relieve said resilient means from tension.

4. An automobile luggage carrier, comprising an enclosure adapted to rest upon an automobile top, a plurality of hook elements arranged to engage under ledges at the sides of the body of the automobile, tensioned resilient means connecting said hooks to said enclosure, straps carried by the bottom of said enclosure, means on each hook member between the hook thereof and said tensioned means slidably receiving a corresponding strap, said straps being adapted to pass over the top of said enclosure to engage and hold the same in place, and means for tightening said straps to relieve said resilient means from tension.

GEORGE H. LE BOEUF.